(12) United States Patent  
Tiwet

(10) Patent No.: US 7,380,568 B2  
(45) Date of Patent: Jun. 3, 2008

(54) WATER FLOW CONTROLLER

(76) Inventor: John Tiwet, 4463 W. Lawn Ave., Waukegan, IL (US) 60085

( * ) Notice: Subject to any disclaimer, the term of this patent is extended or adjusted under 35 U.S.C. 154(b) by 492 days.

(21) Appl. No.: 11/091,459

(22) Filed: Mar. 28, 2005

(65) Prior Publication Data

US 2006/0213561 A1 Sep. 28, 2006

(51) Int. Cl.
*G05D 7/06* (2006.01)
(52) U.S. Cl. .............. 137/488; 137/205; 137/487.5; 137/624.11; 137/907; 251/30.01
(58) Field of Classification Search ............ 137/12, 137/14, 487.5, 488, 624.11, 907, 205; 251/30.01, 251/30.02, 30.05, 129.15
See application file for complete search history.

(56) References Cited

U.S. PATENT DOCUMENTS

| | | | | | |
|---|---|---|---|---|---|
| 3,730,884 | A | * | 5/1973 | Burns et al. ................. | 406/19 |
| 3,777,778 | A | * | 12/1973 | Janu ......................... | 137/487.5 |
| 4,268,383 | A | * | 5/1981 | Trobaugh ................... | 210/103 |
| 5,634,494 | A | * | 6/1997 | Martens ................. | 137/624.11 |
| 6,148,846 | A | * | 11/2000 | Schell ........................ | 137/208 |
| 6,474,357 | B2 | * | 11/2002 | Naski ......................... | 137/205 |
| 7,013,909 | B2 | * | 3/2006 | Shimizu et al. ............. | 137/205 |
| 2005/0016588 | A1 | * | 1/2005 | Shimizu et al. ............. | 137/205 |

* cited by examiner

*Primary Examiner*—Ramesh Krishnamurthy

(57) ABSTRACT

An apparatus for controlling water flow is provided. The apparatus is a novel electronic water controller capable of operation using a battery-type power source, and providing for achievement of long battery life. The apparatus generally comprises an electronic control module, a vacuum pressure sensor, a trigger switch, a vacuum switching module and a means to electrically connect the electronic control module to a power source.

2 Claims, 9 Drawing Sheets

OFF MODE

VACUUM

ATMOSPHERIC PRESURE

OFF MODE

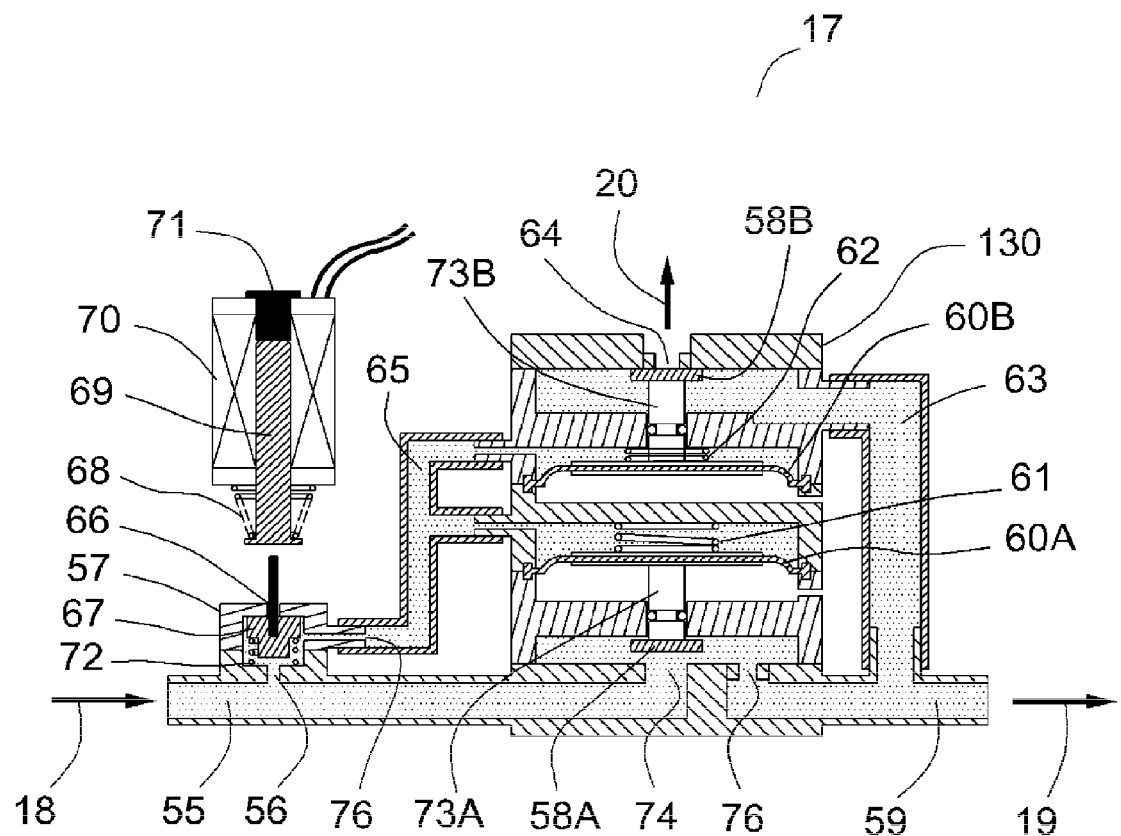
ON MODE
FIG-4
 VACUUM
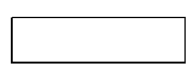 ATMOSPHERIC PRESURE

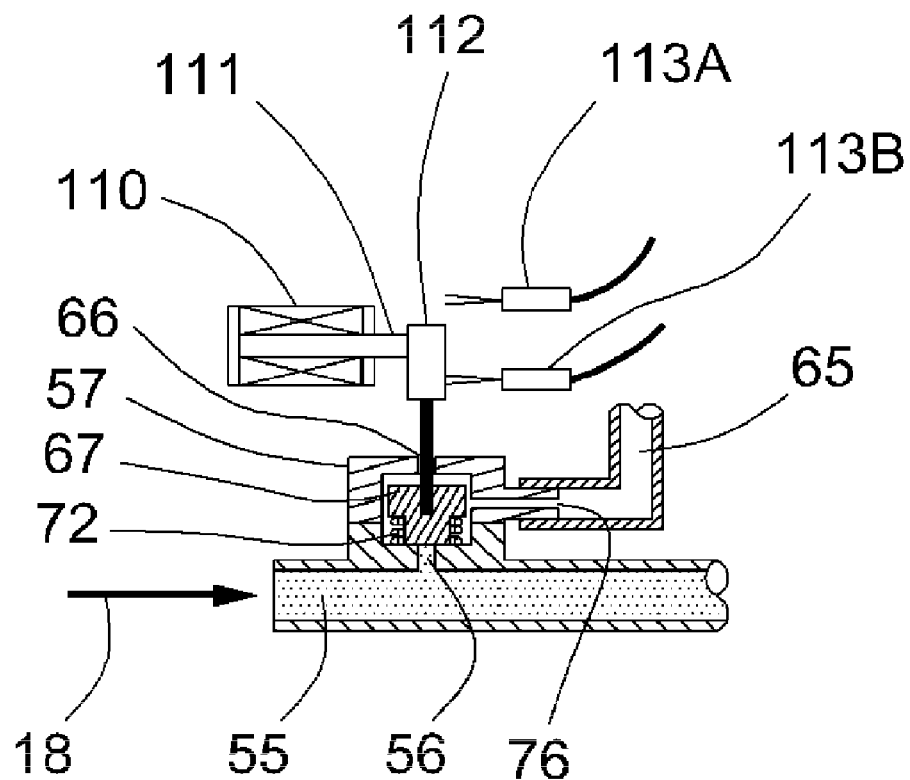
OFF MODE
FIG-5
 VACUUM
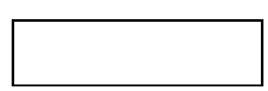 ATMOSPHERIC PRESURE

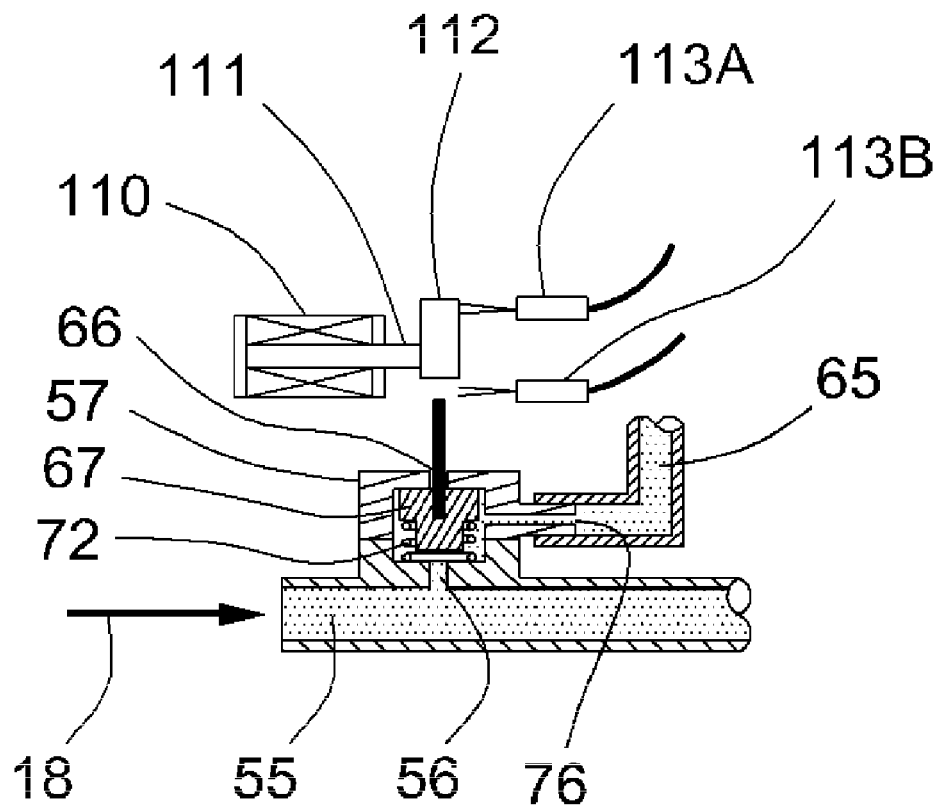
ACTIVATION MODE
FIG-6
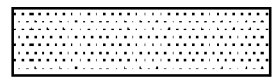 VACUUM
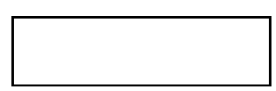 ATMOSPHERIC PRESURE

OFF MODE

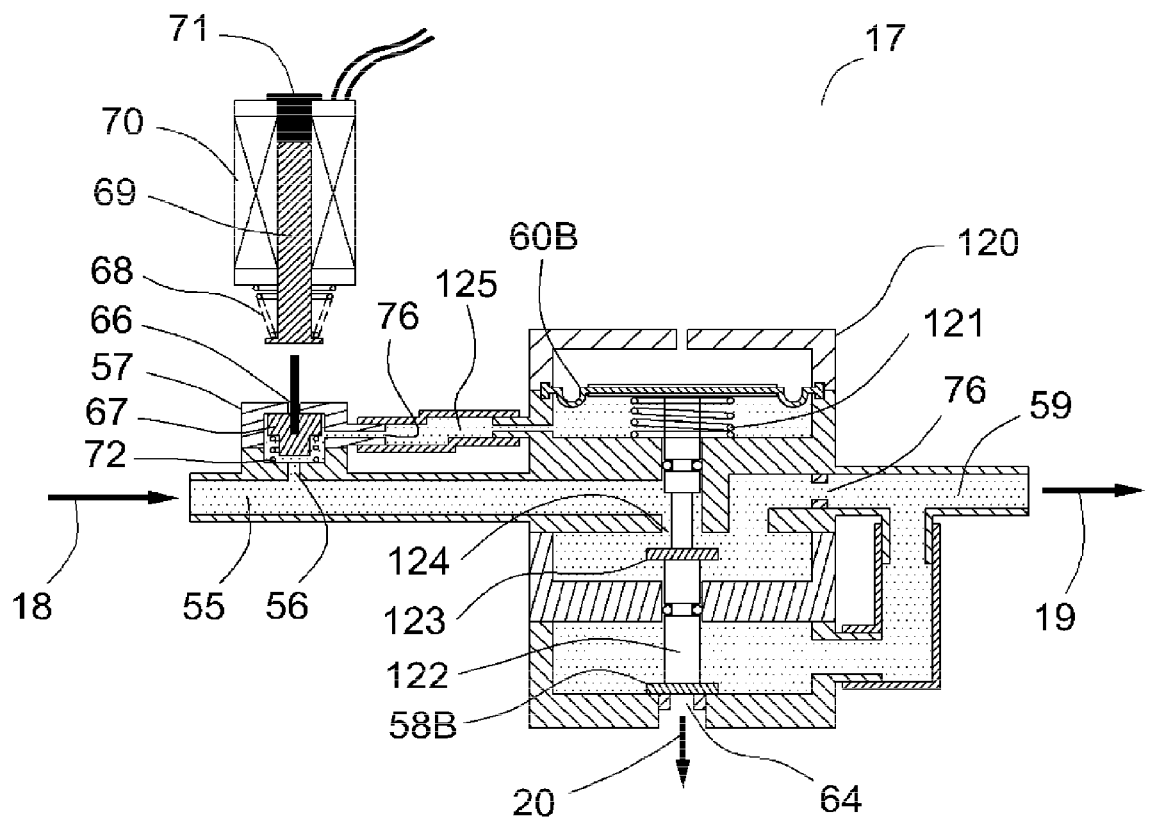
ACTIVATION MODE
FIG-8
 VACUUM
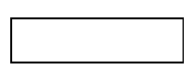 ATMOSPHERIC PRESURE

WATER FLOW CONTROLLER

CROSS-REFERENCE TO RELATED APPLICATIONS

Not Applicable

STATEMENT REGARDING FEDERALLY SPONSORED RESEARCH/DEVELOPMENT

The present invention does not involve any form of federally sponsored research or development.

BACKGROUND OF THE INVENTION

The present invention relates to an apparatus for controlling water flow, namely a novel electronic water controller capable of operation using a battery-type power source. Currently available water controllers are mechanically operated and some applications can be powered using alternating current and direct current.

Typically, water controllers are used in two primary applications. The first application is in water systems comprising a water overflow reservoir. An example of this application can be found in grocery stores. In grocery stores it is common to use refrigerators and freezers, as well as water "spritzers" used to keep produce fresh. Refrigerators and freezers generate condensate, and spritzers generate run-off water. Excess water in the form of condensate and run-off is generally collected in a reservoir, the reservoir typically being open to the atmosphere. The reservoir is typically functionally connected to a vacuum source via an external vacuum-operated valve that is controlled by a water controller. When the excess water within the reservoir exceeds a predetermined volume level, the water controller releases the vacuum to the external valve. The valve opens to allow vacuum pressure to evacuate the water from the reservoir to a collection tank for disposal.

The second type of application in which water controllers are often used is that of toilet systems, especially, but not limited to, toilet systems in institutional buildings, high-rise buildings, ships and the like. In these settings, space is at a premium and vacuum systems provide great flexibility in addressing limited availability of space. In such toilet systems, the actuation of the vacuum is accomplished by different means than in first type of application described above. In toilet systems, typically, the controllers are actuated by a user, either manually by pushbutton or flush handle, or through user movement registered via electric eye apparatus. The underlying water control is common, however, and once actuated the controller releases vacuum in order to evacuate the water and sewage into a holding tank to await disposal.

Currently available mechanical water controllers have inherent weaknesses. When waste or excess water within the reservoir exceeds a predetermined volume level, the water exerts pressure on a diaphragm inside the controller, the pressure being proportional to the height of water within the reservoir. The pressure causes the diaphragm to switch to an "On" position. In this state, vacuum from a vacuum source evacuates a timing chamber internal to the controller and a pilot valve opens and applies vacuum to a main valve. The main valve opens and releases vacuum pressure to the reservoir, thereby evacuating the water from the reservoir. Duration of pilot valve opening is controlled by the decay of vacuum within the internal timing chamber. This decay is in turn controlled by a needle valve that controls the rate of airflow into the timing chamber. The air entering into the chamber increases air pressure in the chamber, thereby reducing vacuum. When the pressure within the timing chamber reaches zero, the pilot valve and the diaphragm reset to the "Off" position.

While mechanical controllers are advantageous owing to their ease of use and low cost, they have several disadvantages that result in decreased reliability, stability and durability. First, mechanical controllers are inherently imprecise. Owing to their dependence upon vacuum pressure levels to regulate duration of remaining in the "On" position, variations in vacuum pressure can result in durations that are too long and too short. If vacuum is too high (lower pressure), the duration will be too long, thus wasting vacuum capacity and risking damage to the water control system. Conversely, when the vacuum is too low (higher pressure), the duration will be too short resulting in inadequate evacuation of water from the reservoir. Additionally, inherent inaccuracies in the measurement of water and system pressures can result in the controller pilot switch being in the "On" position when vacuum is too low (higher pressure).

Second, timing mechanisms in mechanical controllers are inherently unstable because the needle valves are prone to shift during use and transport. Dirt and other particles can accumulate on and occlude the needle valve thereby reducing airflow through the valve. In this scenario the reduced airflow results in longer timing and the controller remaining in the "On" position too long. If the needle valve becomes totally occluded the controller can get stuck in the "On" position resulting in catastrophic failure of the controller and water system.

Third, mechanical controllers offer slow response to changes in vacuum pressure. If vacuum pressure drops rapidly, for example after a power outage, individual mechanical controllers must respond by immediately switching to the "Off" position in order to allow the vacuum source to reduce the system pressure (i.e., increase the vacuum) to a predetermined level.

BRIEF SUMMARY OF THE INVENTION

It is the object of the present invention to improve upon existing water controllers by replacing critical mechanical controller elements with electronic, microprocessor-based control elements. These improvements improve controller functionality by:

1. Providing feedback controls and the ability to perform self-diagnostic functions.
2. Improving the accuracy and precision of timing by eliminating the need to control timing through vacuum pressure. The introduction of electronic control of valve timing provides extremely accurate and precise timing characteristics only possible through microprocessor utilization.
3. Improving upon the stability of the timing mechanism by eliminating needle valves which are inherently susceptible to failure caused by physical vibration, dirt accumulation, moisture and other factors.
4. Providing higher responsiveness to the system status, for example vacuum pressure. Electronic controllers sense and rapidly respond changes in vacuum pressure, thereby reducing the risk of system-wide failure.
5. Allowing battery operation by employing sophisticated algorithms that utilize electronic pulses rather than constant current to open and close vacuum valves thereby minimizing battery drain. Battery operation allows installation regardless of the availability of nearby external power sources.

6. Facilitating the installation and use of audible and visible alarms to indicate system status, including low battery and problematic vacuum levels.

7. Providing optimal performance of vacuum operated toilets by controlling size of apertures that apply and vent vacuum to the vacuum valve.

BRIEF DESCRIPTION OF THE DRAWINGS

FIG. 4 illustrates a schematic view of the apparatus in the "On" mode.

FIG. 5 illustrates a schematic view of a second alternative embodiment of the vacuum switching module in the "Off" mode.

FIG. 6 illustrates a schematic view of a second alternative embodiment of the vacuum switching module in the "On" mode.

FIG. 8 illustrates a schematic view of a first alternative embodiment of the vacuum switching module in the "On" mode.

DETAILED DESCRIPTION OF THE PREFERRED EMBODIMENT

Figure 1:
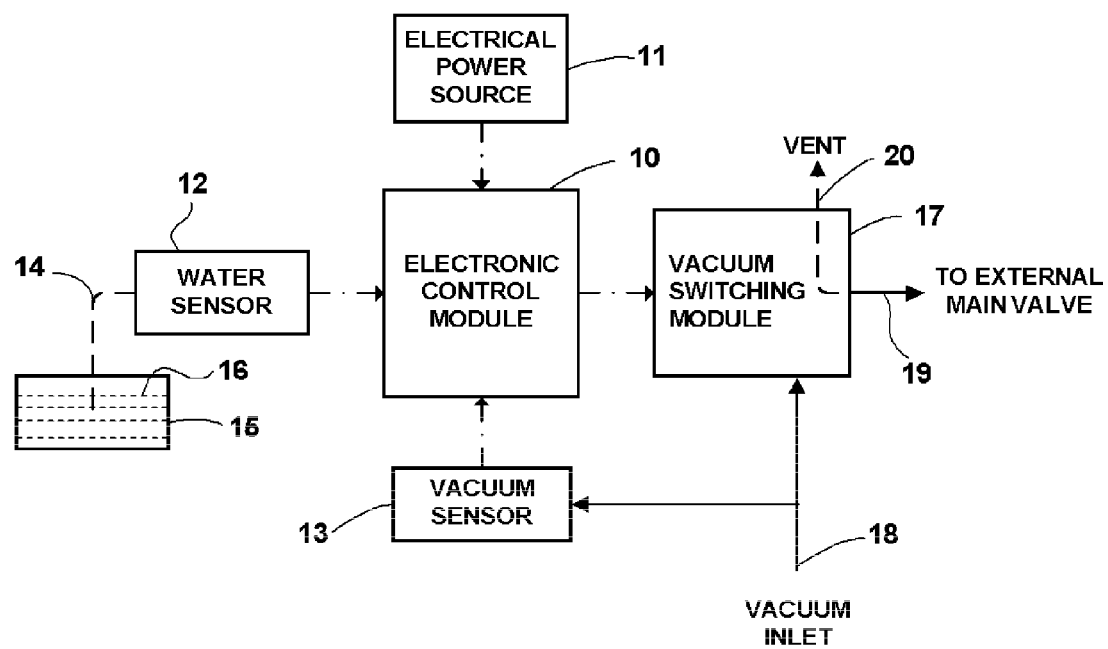
FIG. 1 illustrates a diagrammatic depiction of the apparatus.

The following describes an apparatus for controlling water flow, namely a novel electronic water controller capable of operation using a battery-type power source.

The apparatus comprises an electronic control module 10, a vacuum pressure sensor 13, a trigger switch 12, a vacuum switching module 17 and a means to electrically connect the electronic control module to a power source 11.

The electronic control module 10 is capable of storing an algorithm and receiving input data from at least one external source. The control module is capable of comparing the input data against a predetermined and stored algorithm and giving an output signal based upon the comparison of the input data to the algorithm.

The vacuum pressure sensor 13 is capable of sensing vacuum pressure present within a vacuum system to which the apparatus is fluidly connected. The vacuum pressure sensor is capable of sending output data and is functionally connected to allow input of vacuum pressure data into the electronic control module 10.

The trigger switch 12 is electronically connected to the electronic control module 10 and is capable of sending input data to the electronic control module.

The vacuum switching module 17 is functionally connected to receive electrical pulses from the electronic control module 10 and is capable of opening and closing a valve 19 between an external vacuum source and a vessel in response to the electrical pulses.

The means to electrically connect the electronic control module 10 to a power source 11 is connected such that electrical power can be supplied to the electronic control module.

The electronic control module 10 receives input data from the vacuum pressure sensor 13 and the trigger switch 12. The electronic control module 10 then compares the input data to the predetermined and stored algorithm. The electronic control module sends electrical pulse signals to the vacuum switching module 17 to open and close the vacuum switching module according to the predetermined algorithm stored within the electronic control module 10.

In a preferred embodiment, the vacuum switching module 17 can comprise a solenoid, a solenoid plunger 69, a solenoid plunger spring 68, a dual diaphragm assembly 130, a pilot valve 57, and an air passageway 65.

The solenoid plunger 69 comprises magnetic material and has a first end and a second end.

The solenoid can have a coil 70 and a permanent magnet 71 fixed to the coil. The permanent magnet 71 has a polarity and is enveloped by a permanent magnetic field. The polarity of the permanent magnet can be such that solenoid plunger 69 is drawn toward the permanent magnet 71. The coil 70 is adapted for receiving electronic pulses originating from the electronic control module and is electronically connected to the electronic control module so as to allow the coil to receive electronic pulses from the electronic control module.

The plunger spring 68 can be situated so that it applies tension between the solenoid and the solenoid plunger 69 such that the tension can be increased by spring compression when the solenoid plunger is actuated. The tension between the solenoid and the solenoid plunger 69 is minimally sufficient to overcome the permanent magnetic field of the permanent magnet 71. The first end of the solenoid plunger 69 can be located within the permanent magnetic field of the permanent magnet, the permanent magnetic field applying magnetic force to the solenoid plunger. When the coil 70 receives a first electronic pulse of a specific and predetermined duration from the electronic control module 10, a momentary magnetic field is created around the coil 70 for the duration of the pulse. The momentary magnetic field resulting from the first electronic pulse has a polarity, that polarity being the same as the polarity of the permanent magnetic field of the permanent magnet 71. During the duration of the electronic pulse, and while the coil 70 is surrounded by the momentary magnetic field of the same polarity as the permanent magnetic field of the permanent magnet, the momentary magnetic field of the coil acts to add magnetic force to the permanent magnetic field of the permanent magnet 71. The additional magnetic force, when added to the magnetic force of the permanent magnetic field of the permanent magnet, is sufficient to overcome the plunger spring 68 tension between the solenoid and the solenoid plunger 69. The solenoid plunger is thereby allowed to move toward the permanent magnet 71.

When the solenoid receives a second electronic pulse of reverse polarity and of a predetermined specific duration from the electronic control module 10, during the duration of the second pulse, the coil 70 is surrounded by a second momentary magnetic field. The second momentary field of the coil is of polarity opposite to the permanent magnetic field of the permanent magnet 71. The second momentary field of the coil acts in concert with the plunger spring 68 to overcome the magnetic force of the permanent magnetic field of the permanent magnet 71, thus repelling the solenoid plunger 69 away from the permanent magnet 71. The solenoid plunger returns to its original position.

The dual diaphragm assembly 130 can have a first diaphragm atrium and a second diaphragm atrium. A first diaphragm 60B can be housed within the first diaphragm atrium, and a second diaphragm 60A can be housed within the second diaphragm atrium. The diaphragm assembly can also have a first external atrium and a second external atrium.

The first external atrium can have an aperture 64 capable of providing fluid communication between the first external atrium and atmosphere external to the apparatus. The aperture can be of varying sizes to control the rate of pressure changes within the atrium, larger apertures allowing for rapid changes and smaller apertures providing for slower changes.

The second external atrium can have a first aperture 74 and a second aperture 76. The first aperture 74 can be capable of providing fluid communication between the second external atrium and the vacuum system. The second aperture 76 can be capable of providing fluid communication between the second atrium and a vacuum outlet. The first aperture 74 can be of varying sizes to control the rate of pressure changes within the atrium, larger apertures allowing for rapid changes and smaller apertures providing for slower changes.

The first diaphragm atrium can have an aperture and a plunger 73B. The first diaphragm atrium can also be in fluid communication with a vacuum outlet. The plunger has a first end and a second end. The first end of the plunger can be attached to the first diaphragm 60B. The plunger can extend snugly and movably through the aperture into the first external atrium. The plunger can have a seal gasket 58B attached to the second end. The seal gasket can be adapted to occluding the aperture 64 in the first external atrium when the solenoid is actuated.

The second diaphragm atrium can have an aperture and a plunger 73A. The plunger can have a first end and a second end. The first end of the plunger can be attached to the second diaphragm 60A. The plunger ideally extends snugly and movably through the aperture. The plunger can have a seal gasket 58A attached to the second end. The seal gasket can ideally be adapted to obstruct fluid communication between the vacuum system and the vacuum outlet 76 when the solenoid is not actuated.

The pilot valve 57 can have a housing and a piston 67. The piston can be attached to the second end of the solenoid plunger 69.

The air passageway 65 can have a first aperture, a second aperture, and a third aperture.

The pilot valve housing can have an internal atrium and three apertures: a first aperture 66, a second aperture 56, and a third aperture 76. The first aperture 66 can be adapted to receive the second end of the solenoid plunger. The second aperture 56 can be capable of providing fluid communication between the vacuum system and the internal atrium. The third aperture 76 can be capable of providing fluid communication between the internal atrium and the first aperture of the air passageway;

The air passageway can be capable of providing fluid communication between the internal atrium of the pilot valve housing and the first and second atria of the diaphragm assembly.

The pilot valve piston 67 can be situated so as to obstruct vacuum pressure from communication with the air passageway. The pilot valve piston can be attached to the second end of the solenoid plunger 69 such that when the solenoid is actuated, the solenoid plunger moves the pilot valve piston 67 to a position allowing fluid communication between the vacuum system and the air passageway.

In a first alternative embodiment, the vacuum switching module 17 can comprise a solenoid, a solenoid plunger 69, a solenoid plunger spring 68, a single diaphragm assembly 120, a pilot valve 57, and an air passageway 125.

The solenoid plunger 69 comprises magnetic material and has a first end and a second end.

The solenoid can have a coil 70 and a permanent magnet 71 fixed to the coil. The permanent magnet 71 has a polarity and is enveloped by a permanent magnetic field. The polarity of the permanent magnet can be such that solenoid plunger 69 is drawn toward the permanent magnet 71. The coil 70 is adapted for receiving electronic pulses originating from the electronic control module 10 and is electronically connected to the electronic control module so as to allow the coil to receive electronic pulses from the electronic control module.

The plunger spring 68 can be situated so that it applies tension between the solenoid and the solenoid plunger 69 such that the tension can be increased by spring compression when the solenoid plunger is actuated. The tension between the solenoid and the solenoid plunger 69 is minimally sufficient to overcome the permanent magnetic field of the permanent magnet 71. The first end of the solenoid plunger 69 can be located within the permanent magnetic field of the permanent magnet, the permanent magnetic field applying magnetic force to the solenoid plunger. When the coil 70 receives a first electronic pulse of a specific and predetermined duration from the electronic control module 10, a momentary magnetic field is created around the coil 70 for the duration of the pulse. The momentary magnetic field resulting from the first electronic pulse has a polarity, that polarity being the same as the polarity of the permanent magnetic field of the permanent magnet 71. During the duration of the electronic pulse, and while the coil 70 is surrounded by the momentary magnetic field of the same polarity as the permanent magnetic field of the permanent magnet, the momentary magnetic field of the coil acts to add magnetic force to the permanent magnetic field of the permanent magnet 71. The additional magnetic force, when added to the magnetic force of the permanent magnetic field of the permanent magnet, is sufficient to overcome the plunger spring 68 tension between the solenoid and the solenoid plunger 69. The solenoid plunger is thereby allowed to move toward the permanent magnet 71.

When the solenoid receives a second electronic pulse of reverse polarity and of a predetermined specific duration from the electronic control module 10, during the duration of the second pulse, the coil 70 is surrounded by a second momentary magnetic field. The second momentary field of the coil is of polarity opposite to the permanent magnetic field of the permanent magnet 71. The second momentary field of the coil acts in concert with the plunger spring 68 to overcome the magnetic force of the permanent magnetic field of the permanent magnet 71, thus repelling the solenoid plunger 69 away from the permanent magnet 71. The solenoid plunger returns to its original position.

The single diaphragm assembly 120 can have a diaphragm atrium, a first external atrium and a second external atrium. Additionally, the single diaphragm assembly can have a single diaphragm 60B, a plunger 122 and a first and a second apertures. The plunger has a first end and a second end. The first end of the plunger can be attached to the single diaphragm 60B. The plunger can extend snugly and movably through the first aperture into the first external atrium, and can extend snugly and movably through the second aperture into the second external atrium. The plunger can have a first seal gasket 123 positioned between first and second ends and in close proximity to aperture 124 and a second seal gasket 58B attached to the second end.

The first seal gasket can be adapted to occluding the aperture 124 in the first external atrium when the solenoid not actuated. The first seal gasket can ideally be adapted to obstruct fluid communication between the vacuum system and the vacuum outlet 76 when the solenoid is not actuated.

The second seal gasket can be adapted to occluding the aperture 64 in the second external atrium when the solenoid is actuated.

The pilot valve 57 can have a housing and a piston 67. The piston can be attached to the second end of the solenoid plunger 69.

The air passageway 125 can have a first aperture and a second aperture.

The pilot valve housing can have an internal atrium and three apertures: a first aperture 66, a second aperture 56, and a third aperture 76. The first aperture 66 can be adapted to receive the second end of the solenoid plunger. The second aperture 56 can be capable of providing fluid communication between the vacuum system and the internal atrium. The third aperture 76 can be capable of providing fluid communication between the internal atrium and the first aperture of the air passageway;

The air passageway can be capable of providing fluid communication between the internal atrium of the pilot valve housing and the diaphragm atrium of the single diaphragm assembly.

The pilot valve piston 67 can be situated so as to obstruct vacuum pressure from communication with the air passageway. The pilot valve piston can be attached to the second end of the solenoid plunger 69 such that when the solenoid is actuated, the solenoid plunger moves the pilot valve piston 67 to a position allowing fluid communication between the vacuum system and the air passageway.

Based on prototypes constructed by the inventor, the dual diaphragm assembly is preferred for various factors including the ease of manufacture and the ease of service.

In a second alternative embodiment, the vacuum switching module 17 can comprise a motor 110, a plunger 66, a cam 112, a diaphragm assembly, a pilot valve 57, a plunger spring 72 and an air passageway.

The plunger 66 can have a first end and a second end. The first end of the plunger can be in contact with the cam 112, and the second end of the plunger can be located such that axial movement of the plunger results in opening and closing a valve between the air passageway and the vacuum source.

The motor can be electronically connected to and adapted to receive electronic impulses from the electronic control module 10. The cam 112 can have a lobe profile. The cam can be attached to the motor 110 such that the motor can rotate the cam.

The plunger spring 72 can be positioned such that spring tension pushes the plunger toward the cam 112 and contact is maintained between the plunger 66 and the cam 112. The plunger can be adapted to ride the cam and move axially according to the cam lobe profile.

In operation, the motor 110 is actuated by electronic impulses from the electronic control module 10 and the motor rotates the cam 112. As the cam rotates, and the plunger 66 rides the cam lobe profile, the plunger moves axially from an "Off" position to an "On" position, and vice versa. When a desired position is reached, "Off" and "On", respectively, the motor stops and the cam stops rotating. The motor 110 can be triggered to stop by position sensors 113A and 113B. Alternatively, duration of electronic pulse from the electronic control module can control how long the motor runs, the duration being sufficient to achieve the desired position of the cam.

The diaphragm assembly can have a first diaphragm atrium and a second diaphragm atrium. A first diaphragm 60B can be housed within the first diaphragm atrium, and a second diaphragm 60A can be housed within the second diaphragm atrium. The diaphragm assembly can also have a first external atrium and a second external atrium.

The first external atrium can have an aperture 64 capable of providing fluid communication between the first external atrium and atmosphere external to the apparatus. The aperture can be of varying sizes to control the rate of pressure changes within the atrium, larger apertures allowing for rapid changes and smaller apertures providing for slower changes.

The second external atrium can have a first aperture 74 and a second aperture 76. The first aperture 74 can be capable of providing fluid communication between the second external atrium and the vacuum system. The second aperture 76 can be capable of providing fluid communication between the second atrium and a vacuum outlet. The first aperture 74 can be of varying sizes to control the rate of pressure changes within the atrium, larger apertures allowing for rapid changes and smaller apertures providing for slower changes.

The first diaphragm atrium can have an aperture and a plunger 73B. The first diaphragm atrium can also be in fluid communication with a vacuum outlet. The plunger has a first end and a second end. The first end of the plunger can be attached to the first diaphragm 60B. The plunger can extend snugly and movably through the aperture into the first external atrium. The plunger can have a seal gasket 58B attached to the second end. The seal gasket can be adapted to occluding the aperture 64 in the first external atrium when the solenoid is actuated.

The second diaphragm atrium can have an aperture and a plunger 73A. The plunger can have a first end and a second end. The first end of the plunger can be attached to the second diaphragm 60A. The plunger ideally extends snugly and movably through the aperture. The plunger can have a seal gasket 58A attached to the second end. The seal gasket can ideally be adapted to obstruct fluid communication between the vacuum system and the vacuum outlet 76 when the solenoid is not actuated.

The pilot valve 57 can have a housing and a piston 67. The piston can be attached to the second end of the solenoid plunger 69.

The air passageway 65 can have a first aperture, a second aperture, and a third aperture.

The pilot valve housing can have an internal atrium and three apertures: a first aperture 66, a second aperture 56, and a third aperture 76. The first aperture 66 can be adapted to receive the second end of the solenoid plunger. The second aperture 56 can be capable of providing fluid communication between the vacuum system and the internal atrium. The third aperture 76 can be capable of providing fluid communication between the internal atrium and the first aperture of the air passageway;

The air passageway can be capable of providing fluid communication between the internal atrium of the pilot valve housing and the first and second atria of the diaphragm assembly.

The pilot valve piston 67 can be situated so as to obstruct vacuum pressure from communication with the air passageway. The pilot valve piston can be attached to the second end of the solenoid plunger 69 such that when the solenoid is actuated, the solenoid plunger moves the pilot valve piston 67 to a position allowing fluid communication between the vacuum system and the air passageway.

The trigger switch 12 can comprise a manually operated switch and a water level sensor. Manually operated switches can be of several varieties, including switches physically operated by a user in direct contact with the switch, and electric eye-type switches actuated by movements of the user in close proximity to the switch as commonly found in public restrooms. The water level sensor should be capable of and positioned for sensing water level within a given vessel. The water level sensor can be capable of sending output data and functionally connected to input water level data into the electronic control module.

The output of the electronic control module 10 can include, in addition to electrical pulses used to reverse the polarity of the solenoid permanent magnet, user detectable alarms when input data indicates system problems. For example, when the vacuum pressure sensor 13 indicates a state of low vacuum (higher pressure), the electronic control module can indicate this status to a user. Other system states, such as available power levels and water levels can also be monitored and alarmed. The alarms can be audible and visible.

A principal feature of the present invention is that it is readily adaptable for use with a variety of power sources 11, including sources of alternating current, sources of direct current and battery power. In installations where power outlets are not readily available, battery power is an option. The design and logic of the apparatus is such that only small amounts of power are required to open and close the vacuum switching module because only minute pulses of electricity are required. The vacuum switching module 17 stays closed until the electronic control module 10 sends a minute electronic pulse to reverse the polarity of the solenoid coil 70. Once open, the vacuum switching module stays 17 open until the polarity of the solenoid coil is once again pulsed back to its original polarity. The result is very low power consumption, making this apparatus well-suited to battery operation.

Figure 2A:
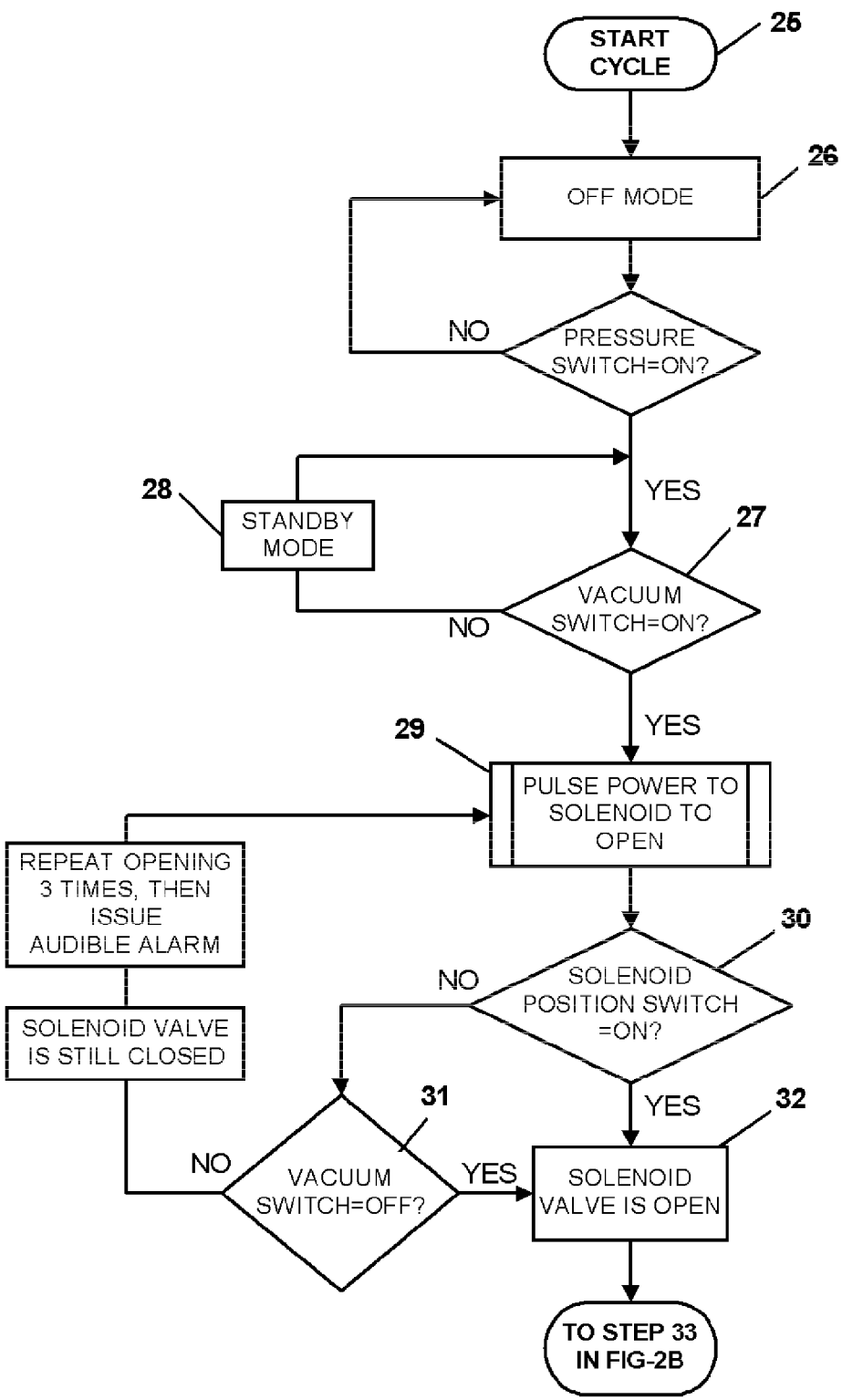
FIGS. 2A and 2B illustrate a flow diagram showing the logic of a preferred embodiment.
Figure 2B:
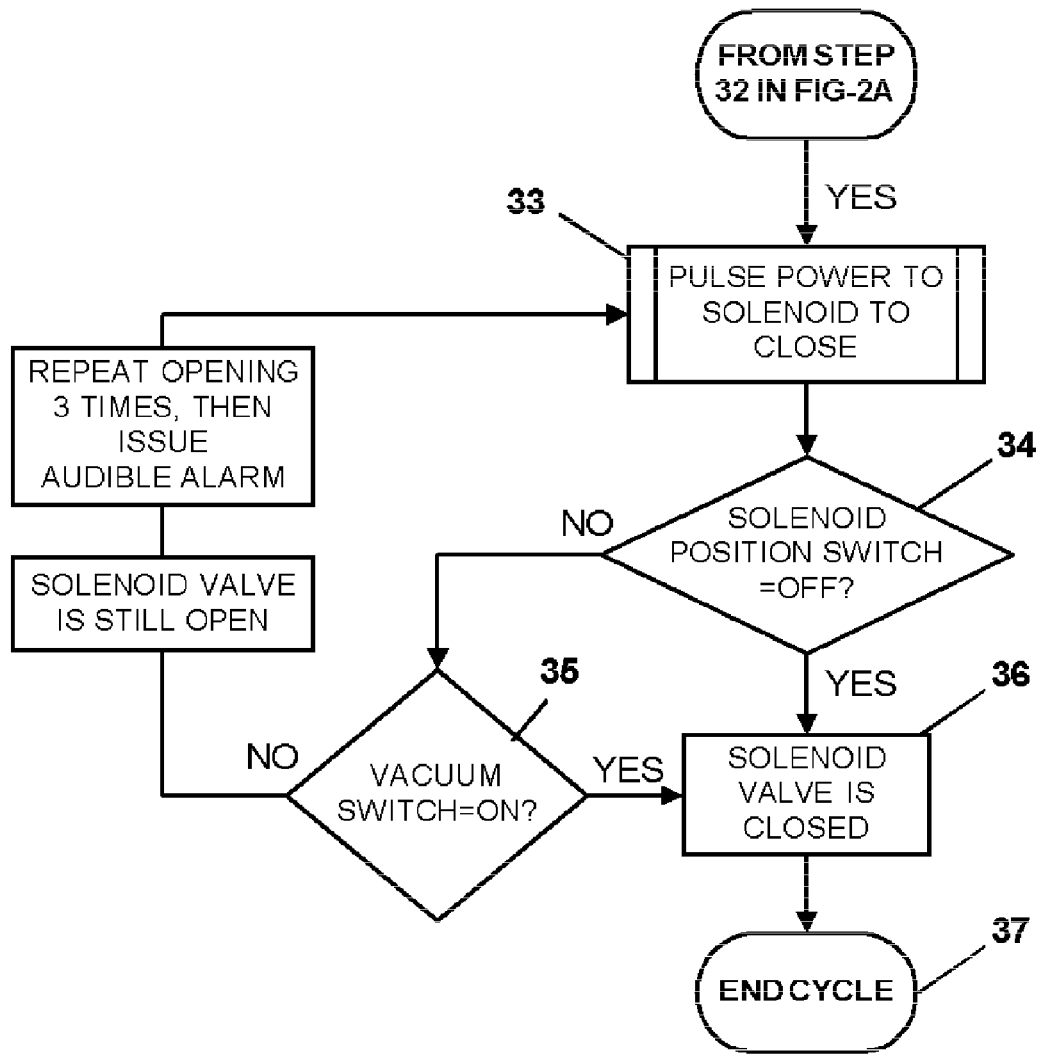
Figure 3:
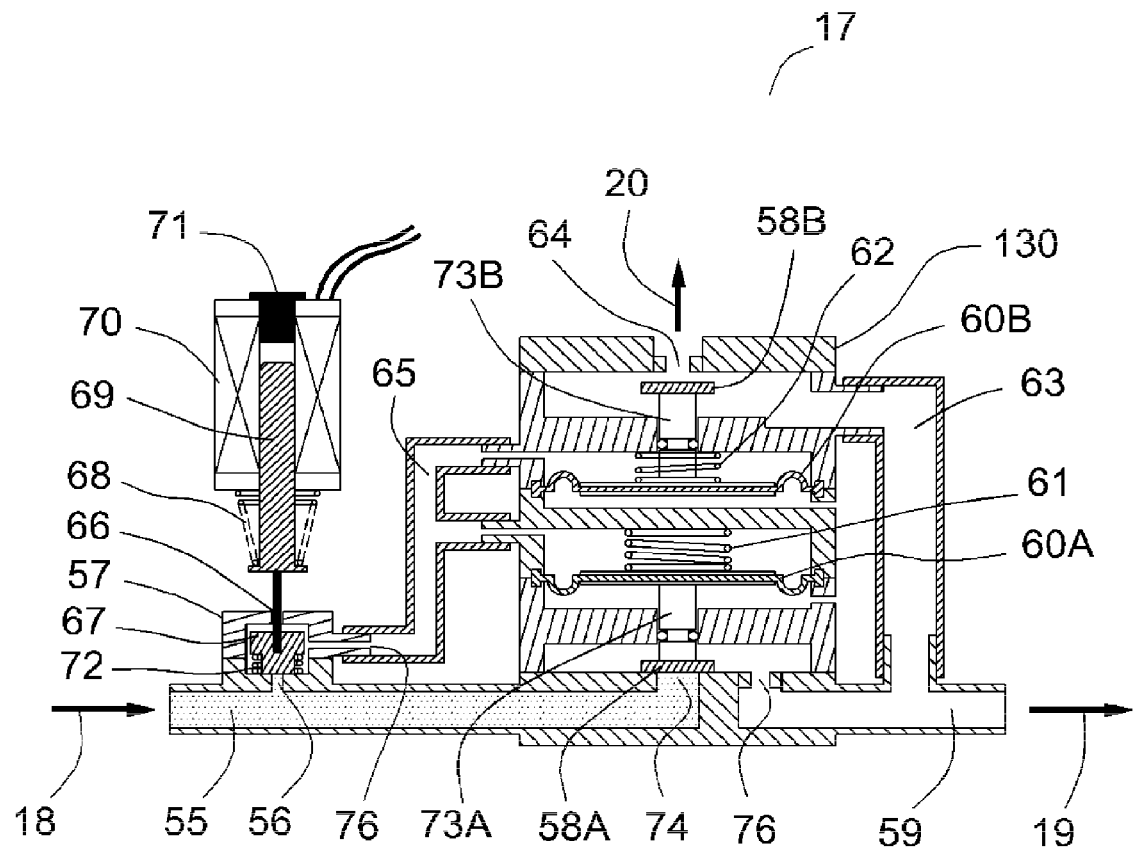
FIG. 3 illustrates a schematic view of the apparatus in the "Off" mode.
Figure 7:
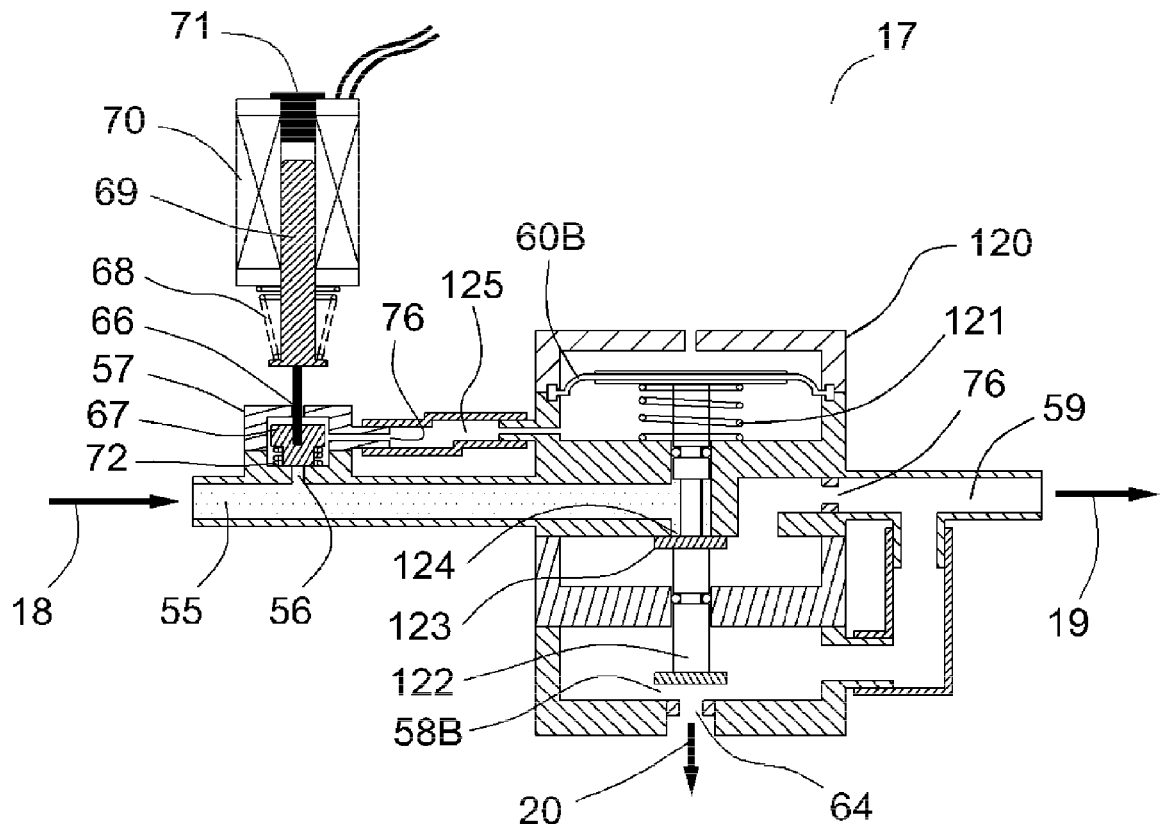
FIG. 7 illustrates a schematic view of a first alternative embodiment of the vacuum switching module in the "Off" mode.

In a preferred embodiment, a typical operational cycle of the apparatus uses the following logic (see FIG. 2A and FIG. 2B). The cycle begins with the apparatus in an "Off" mode, with no vacuum being applied to an external water or sewage vessel ("vessel"). When the switch mechanism is activated, either manually by a user or automatically by a water level sensor, the switch sends electronic data indicating a change from "Off" to "On" to the electronic control module. The electronic control module receives the data and proceeds to compare data received from the vacuum pressure sensor to the predetermined algorithm to determine that sufficient vacuum is available to evacuate the vessel. If insufficient vacuum is available, the apparatus remains in a standby or "Off" mode until sufficient vacuum is available. If sufficient vacuum is available, the electronic control module sends an electronic pulse to the solenoid, reversing the polarity of the solenoid permanent magnet.

If the solenoid switch remains closed, another attempt at opening the solenoid can occur, possibly with a longer pulse duration, and an alarm can be triggered. If the solenoid opens properly, it will remain in an "Open" mode a predetermined amount of time until the electronic control module sends another electronic pulse of reverse polarity from the first pulse, thus reversing the polarity of the solenoid permanent magnet back to its original polarity. A feedback loop indicating that the solenoid returned to "Off" mode properly can be provided and an alarm can be issued if problems occur.

When the solenoid is in "Off" mode, the pilot valve piston obstructs fluid communication between the vacuum system and the air passageway and the air passageway remains at atmospheric pressure. The first diaphragm atrium and the second diaphragm atrium, each being in fluid communication with the air passageway, both remain at atmospheric pressure.

In this mode, the plunger extending from the first diaphragm into the first external atrium remains positioned such that fluid communication between the first external atrium and the atmosphere is maintained. Also in this mode, the plunger extending from the second diaphragm into the second external atrium remains positioned so as to obstruct fluid communication between the second external atrium and the vacuum system.

When the apparatus is actuated and enters the "On" mode, the pilot valve piston is moved to a position so as to allow fluid communication between the vacuum system and the air passageway. This results in the air passageway, and both diaphragm atria being evacuated. As the diaphragm atria are evacuated, the respective diaphragms are collapsed, thereby moving their respective plungers. The plunger attached to the first diaphragm is moved so as to obstruct fluid communication between the first external atrium and the atmosphere. The plunger attached to the second diaphragm is moved so as to allow fluid communication between the vacuum system and the second external atrium, which is subsequently evacuated. Because the vacuum outlet is in fluid communication with the second external atrium, the vacuum outlet is also evacuated and the vacuum can be applied to the vessel.

The end of the cycle begins after a predetermined time, set within the algorithm of the electronic control module, when the electronic control module sends the second electronic pulse to reverse the polarity of the solenoid permanent magnet. The reversed polarity of the solenoid permanent magnet pushes the solenoid plunger into a position to obstruct fluid communication between the vacuum system and the air passageway. This results in a rise in pressure in the air passageway, as well as the first and second diaphragm atria. As the pressure rises in the first and second diaphragm atria, the first and second diaphragms are relaxed. Relaxation of the first diaphragm causes the plunger attached to it to move to a position so as to allow fluid communication between the first external atrium and the atmosphere. Essentially simultaneously, relaxation of the second diaphragm cause the plunger attached thereto to move into a position so as to obstruct fluid communication between the second external atrium and the vacuum system.

What is claimed is:

1. An apparatus comprising:
   an electronic control module, the electronic control module capable of storing an algorithm, the electronic control module capable of receiving input data from at least one external source, and the control module capable of giving an output signal based upon a comparison of the input data to the algorithm;
   a vacuum pressure sensor, the vacuum pressure sensor being capable of sensing vacuum pressure present within a vacuum system, the vacuum pressure sensor being capable of sending output data, the vacuum pressure sensor being functionally connected to allow input of vacuum pressure data into the electronic control module;

a trigger switch, the trigger switch being electronically connected to the electronic control module, the trigger switch being capable of sending input data to the electronic control module;

a vacuum switching module functionally connected to receive electrical pulses from the electronic control module, the vacuum switching module being capable of opening and closing a valve between an external vacuum source and a vessel; and a means to electrically connect the electronic control module to a power source;

wherein the electronic control module receives input data from the vacuum pressure sensor and the trigger switch and the electronic control module sends electrical pulse signals to the vacuum switching module to open and close the vacuum switching module according to a predetermined algorithm stored within the electronic control module;

the vacuum switching module comprising a solenoid, a solenoid plunger, a solenoid plunger spring, a diaphragm assembly, a pilot valve, and an air passageway;

the solenoid plunger comprises magnetic material and has a first end and a second end, the second end of the plunger being located such that axial movement of the plunger results in opening and closing a valve between the air passageway and the vacuum source;

the solenoid has a coil and a permanent magnet fixed to the coil, the permanent magnet has a polarity and is enveloped by a permanent magnetic field, the polarity of the permanent magnet being such that solenoid plunger is drawn toward the permanent magnet, the coil being adapted for receiving electronic pulses originating from the electronic control module and being electronically connected to the electronic control module so as to allow the coil to receive electronic pulses from the electronic control module;

the plunger spring being situated so that it applies tension between the solenoid and the solenoid plunger such that the tension can be increased by spring compression when the solenoid plunger is actuated, the tension between the solenoid and the solenoid plunger being minimally sufficient to overcome the permanent magnetic field of the permanent magnet, the first end of the solenoid plunger being located within the permanent magnetic field of the permanent magnet, the permanent magnetic field applying magnetic force to the solenoid plunger;

the coil functioning such that when the coil receives a first electronic pulse of a specific and predetermined duration from the electronic control module a momentary magnetic field is created around the coil for the duration of the pulse, the momentary magnetic field resulting from the first electronic pulse having a polarity, that polarity being the same as the polarity of the permanent magnetic field of the permanent magnet, the coil functioning such that during the duration of the first electronic pulse and while the coil is surrounded by the momentary magnetic field of the same polarity as the permanent magnetic field of the permanent magnet, the momentary magnetic field of the coil acts to add magnetic force to the permanent magnetic field of the permanent magnet such that the additional magnetic force, when added to the magnetic force of the permanent magnetic field of the permanent magnet, is sufficient to overcome the plunger spring tension between the solenoid and the solenoid plunger;

the coil functioning such that when the solenoid receives a second electronic pulse of reverse polarity and of a predetermined specific duration from the electronic control module the coil, during the duration of the second pulse, generates a second momentary magnetic field, the second momentary field of the coil being of polarity opposite to that of the permanent magnetic field of the permanent magnet, the second momentary field of the coil acting in concert with the plunger spring to overcome the magnetic force of the permanent magnetic field of the permanent magnet, thus repelling the solenoid plunger away from the permanent magnet;

the diaphragm assembly having a first diaphragm atrium and a second diaphragm atrium, the diaphragm assembly having a first diaphragm housed within the first diaphragm atrium, and a having second diaphragm housed within the second diaphragm atrium, the diaphragm assembly having a first external atrium and a second external atrium;

the first external atrium having an aperture capable of providing fluid communication between the first external atrium and atmosphere external to the apparatus;

the second external atrium having a first aperture and a second aperture, the first aperture being capable of providing fluid communication between the second atrium and the vacuum system, the second aperture being capable of providing fluid communication between the second atrium and a vacuum outlet;

the first diaphragm atrium having an aperture and a plunger, the plunger having a first end and a second end, the first end of the plunger being attached to the first diaphragm, the plunger extending snugly and movably through the aperture into the first external atrium, the plunger having a seal gasket attached to the second end, the seal gasket being adapted to occluding the aperture in the first external atrium when the solenoid is actuated;

the second diaphragm atrium having an aperture and a plunger, the plunger having a first end and a second end, the first end of the plunger being attached to the second diaphragm, the plunger extending snugly and movably through the aperture, the plunger having a seal gasket attached to the second end, the seal gasket being adapted to obstruct fluid communication between the vacuum system and the vacuum outlet when the solenoid is not actuated;

a pilot valve, the pilot valve having a housing and a piston;

the piston being attached to the second end of the solenoid plunger, the piston being enclosed by the housing;

an air passageway, the air passageway having a first aperture, a second aperture, and a third aperture;

the pilot valve housing having an internal atrium, the pilot valve housing having a first aperture, a second aperture, and a third aperture, the first aperture being adapted to receive the second end of the solenoid plunger, the second aperture providing fluid communication between the vacuum system and the internal atrium, the third aperture providing fluid communication between the internal atrium and the first aperture of the air passageway;

the air passageway being capable of providing fluid communication between the internal atrium of the pilot valve housing and the first and second atria of the diaphragm assembly;

the pilot valve being situated so as to obstruct vacuum pressure from communication with the air passageway, the pilot valve piston being attached to the second end of the solenoid plunger such that when the solenoid is actuated, the solenoid plunger moves the pilot valve piston to a position allowing fluid communication between the vacuum system and the air passageway.

2. An apparatus as described in claim 1, wherein said power source is a battery.

* * * * *